March 2, 1926.

J. M. GREEN ET AL 1,574,812

DISK SHARPENER

Filed Feb. 2, 1925

Inventors
J. M. Green
A. Thomas

By Clarence O'Brien

Attorney

Patented Mar. 2, 1926.

1,574,812

UNITED STATES PATENT OFFICE.

JOHN M. GREEN AND ABE THOMAS, OF SAN BENITO, TEXAS.

DISK SHARPENER.

Application filed February 2, 1925. Serial No. 6,315.

*To all whom it may concern:*

Be it known that we, JOHN M. GREEN and ABE THOMAS, both citizens of the United States, residing at San Benito, in the county of Cameron and State of Texas, have invented certain new and useful Improvements in a Disk Sharpener, of which the following is a specification.

This invention relates to improvements in disk sharpeners and has for its principal object to provide a simple and efficient device which may be readily and easily attached to an agricultural implement such as a disk harrow, cultivator or the like for the purpose of sharpening the cutting edge of the disk while the agricultural implement is in use and without interfering with the operation thereof.

One of the important objects of the present invention is to provide a disk sharpener of the above-mentioned character, which will automatically sharpen the cutting edge of the disk while the agricultural implement is in operation, thus saving considerable time and labor.

A further object is to provide a disk sharpener of the above-mentioned character, wherein means is provided for holding the sharpening element in engagement with the cutting edge of the disk, additional means being provided for limiting the sharpening of the disk.

A further object is to provide a disk sharpener of the above-mentioned character, which is simple in construction, inexpensive, strong and durable, and further well adapted for the purposes for which it is designated.

Other objects and advantages of this invention will become apparent during the course of the following description.

In the accompanying drawing, forming a part of this specification, and in which like numerals designate like parts throughout the same:

Figure 1:
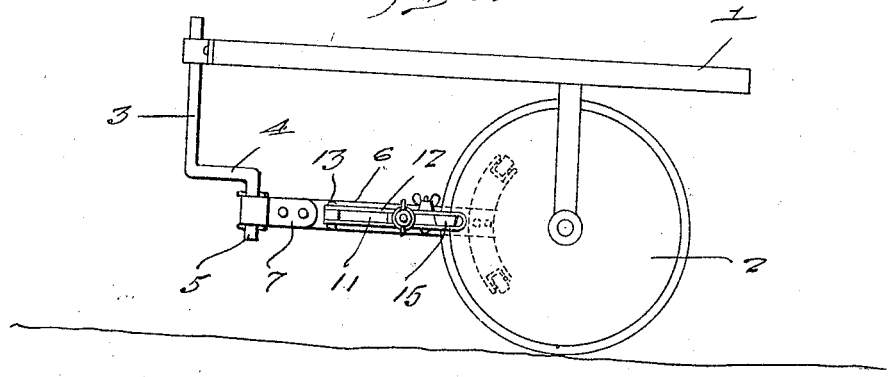
Figure 1 is a side elevation of the disk sharpener embodying our invention showing the same applied.

In the drawing, wherein for the purpose of illustration is shown the preferred embodiment of our invention, the numeral 1 designates a portion of the beam of a cultivator or plow, the rotary disk 2 being associated therewith in the manner well known in the art. In order that the cutting edge of the disk may be sharpened without necessitating the removal of the disk from the agricultural implement and further permit the sharpening of the cutting edge of the disk while the agricultural implement is in actual use, we provide a structure which is shown in Fig. 1 of the drawing.

The sharpening device comprises a vertical rod 3, the upper end of which is secured on the forward end of the beam 1 in any suitable manner, the lower portion of the rod being disposed laterally as illustrated at 4 and thence downwardly as illustrated at 5. An elongated arm preferably in the form of a flat arm and indicated by the numeral 6 is pivotally supported at its forward end on the downwardly extending lower portion 5 of the rod 3 through the medium of the clamp indicated generally by the numeral 7, the forward end of the arm 6 being detachably secured in the clamp through the medium of the fastening means illustrated at 8.

The arm 6 extends rearwardly of the forward portion of the beam 1 and terminates at a point adjacent the concave inner face of the disk 2. A cross arm 9 is secured intermediate its ends on the rear end of the arm 6, the same being substantially arcuate in design as clearly illustrated in Fig. 1. The respective ends of the cross arm 9 being bifurcated and provide means for supporting therein the guide rollers 10 which frictionally engage the concave inner face of the disk 2 at a point adjacent the cutting edge thereof.

A relatively flat block 11 is mounted on the intermediate portion of the inner side of the arm 6. A substantially U-shaped member 12 formed of a single piece of strap iron material has the free ends of the arms thereof pivotally secured on the forward ends of the blocks 11 as indicated at 13. The U-shaped member 12 is of such construction as to enable the same to have its arms extend over the upper and lower faces of the block as is obvious from the construction more clearly illustrated in the drawing. A vertical pin 14 extending through the rearward portion of the block 11 and the respective ends thereof are adapted for engagement with the inner edges of the arms of the U-shaped member 12 for limiting the inward movement of the U-shaped member with respect to the arm 6.

The sharpening member designated generally by the numeral 15 is adjustably supported in a closed end of the U-shaped member 12 through the medium of the bolt 16 and the thumb nut 17. The inner end of the sharpening member 15 protrudes beyond the inner side of the closed end of the U-shaped member 12 and engages the cutting edge of the disk which is to be sharpened in the manner clearly illustrated in Fig. 2. For the purpose of holding the sharpening member 15 in engagement with the cutting edge of the disk, there is provided a transversely extending bolt 18 the same being disposed through a suitable opening provided therefor in the arm 6 adjacent the rear end of the block 11.

Figure 2:
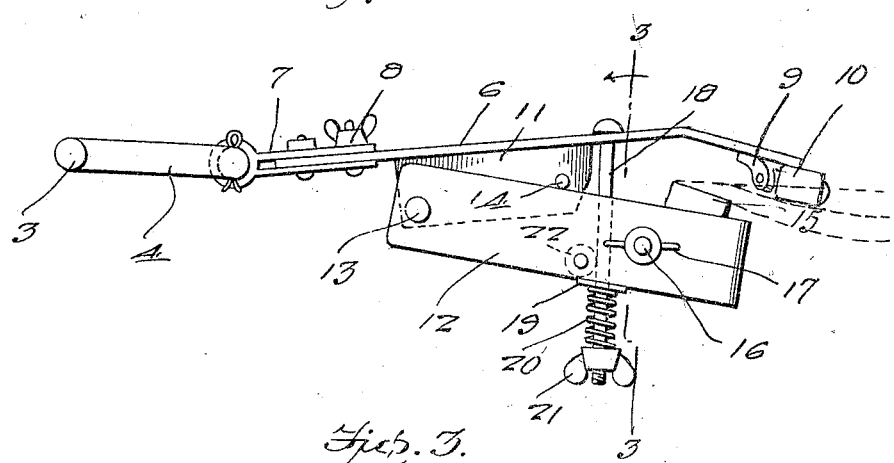
Figure 2 is a top plan view thereof.
Figure 3:
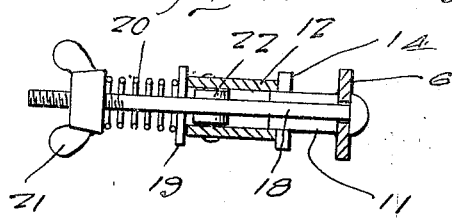
Figure 3 is a sectional view taken approximately on line 3—3, of Figure 2.
Figure 4:
Figure 4 is a detail side elevation of the sharpening elements.

The threaded end of the bolt extends through the U-shaped member 12 between the parallel spaced arms thereof as illustrated further in the drawing. The washer or the like illustrated at 19 is disposed over the free end of the bolt 18 and engages the outer side edges of the arms of the U-shaped member. A spring 20 encircles the outer end of the bolt 18 and engages the washer 19. A thumb nut 21 is threaded on the outer threaded end of the bolt 18 and cooperates with the coil spring for adjusting the tension thereof. The purpose of the coil spring is to provide a means for automatically holding the U-shaped member 12 in such a manner as to cause the sharpening member 15 to be in engagement with the cutting edge of the disk. As above stated, the pin 14 will limit the inward movement of the U-shaped arms of the U-shaped member 12 and cooperates with the bolt 8 in the manner as is illustrated in Figs. 2 and 3.

It will thus be seen that from the foregoing description, that a disk sharpener has been provided for use in conjunction with agricultural implements employing cutting disks whereby the device may be readily and easily adjusted in position on the implement and will sharpen the cutting edge of each disk during the usual operation of the implement thus saving considerable time and labor in obviating the necessity of having to remove a disk whenever it becomes necessary to resharpen the cutting edge thereof.

While we have shown the preferred embodiment of our invention, it is to be understood that various changes in the size, shape, and arrangement of parts may be resorted to, without departing from the spirit of the invention, and the scope of the appended claims.

Having thus described our invention, what we claim as new is:—

1. A disk sharpener comprising an arm pivotally supported at one end to the beam of an agricultural implement, guide rollers supported on the opposite end of the arm and engaging the face of a disk supported by said beam, a block secured on the arm and extending laterally therefrom, a sharpener, a substantially U-shaped member, the free ends of the arms thereof being pivotally secured on said block, means for securing a sharpener in the closed end of the member, and means associated with said arm and said member for holding the sharpener in engagement with the cutting edge of the disk.

2. A disk sharpener comprising an arm pivotally supported at one end to the beam of an agricultural implement, guide rollers supported on the opposite end of the arm and engaging the face of a disk supported by said beam, a block secured on the arm and extending laterally therefrom, a sharpener, a substantially U-shaped member, the free ends of the arms thereof being pivotally secured on said block, means for securing a sharpener in the closed end of the member, means associated with said arm and said member for holding the sharpener in engagement with the cutting edge of the disk, and means on said block for limiting the inward movement of the said U-shaped member with respect thereto.

3. A disk sharpener comprising an arm pivotally supported at one end of the beam of an agricultural implement, guide rollers supported on the opposite end of the arm and engaging the face of a disk supported by said beam, a block secured on the arm and extending laterally therefrom, a sharpener, a substantially U-shaped member, the free ends of the arms thereof being pivotally secured on said block, means for securing a sharpener in the closed end of the member, means associated with said arm and said member for holding the sharpener in engagement with the cutting edge of the disk, said means comprising a bolt extending transversely through the arm, the free end thereof being disposed between the arms of the U-shaped member, a coil spring encircling the outer end of said bolt and engaging the outer side edges of said U-shaped member, and a thumb nut threaded on said bolt for adjusting the tension of said coil spring.

4. A disk sharpener comprising an arm, means for pivotally supporting the same at its forward end to the forward portion of the beam of an agricultural implement, a cross arm supported immediate its ends on the rear end of said arm, guide rollers supported in the respective ends of said cross arm, and engaging the outer face of a disk supported by said beam, a block secured to the inner side of the arm, a sharpening member, a substantially U-shaped holder pivotally supported at the free end thereof on the forward end of said block, means for adjustably securing the sharpening member in the closed end of the U-shaped holder, means associated with the arm and said U-shaped holder for automatically holding the sharpening element in engagement with the cutting edge of the disk, and means for limiting the inward movement of the U-shaped holder with respect to said block.

In testimony whereof we sign our signatures.

JOHN M. GREEN.
ABE THOMAS.